United States Patent
Ramasubramonian et al.

(10) Patent No.: US 10,728,559 B2
(45) Date of Patent: Jul. 28, 2020

(54) PRECISION OF COMPUTATION AND SIGNALING OF DYNAMIC RANGE ADJUSTMENT AND COLOR REMAPPING INFORMATION

(71) Applicant: QUALCOMM Incorporated, San Diego, CA (US)

(72) Inventors: Adarsh Krishnan Ramasubramonian, San Diego, CA (US); Joel Sole Rojals, San Diego, CA (US); Dmytro Rusanovskyy, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 189 days.

(21) Appl. No.: 16/028,212

(22) Filed: Jul. 5, 2018

(65) Prior Publication Data

US 2019/0014330 A1  Jan. 10, 2019

Related U.S. Application Data

(60) Provisional application No. 62/529,968, filed on Jul. 7, 2017.

(51) Int. Cl.
*G06K 9/00* (2006.01)
*H04N 19/186* (2014.01)
(Continued)

(52) U.S. Cl.
CPC .......... *H04N 19/186* (2014.11); *G06T 5/009* (2013.01); *H04N 19/117* (2014.11);
(Continued)

(58) Field of Classification Search
CPC .... H04N 19/186; H04N 19/46; H04N 19/187; H04N 19/117; H04N 19/70; H04N 19/30;
(Continued)

(56) References Cited

U.S. PATENT DOCUMENTS 6,236,751 B1 * 5/2001 Farrell ...................... G06T 5/40
382/168
6,973,221 B1 * 12/2005 Xue ..................... H04N 19/176
375/E7.135

(Continued)

FOREIGN PATENT DOCUMENTS

EP  3131296 A1  2/2017
WO  2017053849 A1  3/2017

OTHER PUBLICATIONS

International Search Report and Written Opinion—PCT/US2018/041097—ISA/EPO—dated Sep. 24, 2018.
(Continued)

*Primary Examiner* — Aaron W Carter
(74) *Attorney, Agent, or Firm* — Qualcomm Incorporated

(57) ABSTRACT

An apparatus configured to process video data includes a memory and a processor in communication with the memory where the processor is configured to obtain an input picture including a color component having a first color characteristic, obtain a plurality of parameters associated with the color component of at least one sample of the input picture where the plurality of parameters are indicative of pivot points associated with a piece-wise linear function associated with the color component, determine that a value of at least one parameter of the plurality of parameters includes a negative value, apply, on the at least one sample of the input picture, the piece-wise linear function defined with the at least one parameter having a negative value, generate at least one output sample of an output picture including the color component having a second color characteristic based on the application of the piece-wise linear function.

30 Claims, 7 Drawing Sheets

(51) Int. Cl.
*H04N 19/98* (2014.01)
*H04N 19/513* (2014.01)
*G06T 5/00* (2006.01)
*H04N 19/30* (2014.01)
*H04N 19/70* (2014.01)
*H04N 19/117* (2014.01)
*H04N 19/187* (2014.01)
*H04N 19/46* (2014.01)
*H04N 19/159* (2014.01)
*H04N 19/51* (2014.01)

(52) U.S. Cl.
CPC ........... *H04N 19/187* (2014.11); *H04N 19/30* (2014.11); *H04N 19/46* (2014.11); *H04N 19/513* (2014.11); *H04N 19/70* (2014.11); *H04N 19/98* (2014.11); *H04N 19/159* (2014.11); *H04N 19/51* (2014.11)

(58) Field of Classification Search
CPC ...... H04N 19/513; H04N 19/98; H04N 19/51; H04N 19/159; G06T 5/009
See application file for complete search history.

(56) References Cited

U.S. PATENT DOCUMENTS

| | | | | |
|---|---|---|---|---|
| 10,595,032 | B2* | 3/2020 | Ramasubramonian | H04N 19/184 |
| 2009/0153576 | A1* | 6/2009 | Keller | G06F 17/10 345/581 |
| 2016/0203618 | A1* | 7/2016 | Li | G06T 11/001 345/591 |
| 2016/0205367 | A1* | 7/2016 | Wallace | H04N 9/64 348/571 |
| 2016/0205368 | A1* | 7/2016 | Wallace | H04N 9/64 348/571 |
| 2016/0205369 | A1* | 7/2016 | Wallace | H04N 5/20 348/571 |
| 2016/0205370 | A1* | 7/2016 | Wallace | G06T 5/007 348/571 |
| 2016/0205371 | A1* | 7/2016 | Wallace | G06T 5/007 348/571 |
| 2016/0205372 | A1* | 7/2016 | Liu | H04N 5/20 |
| 2016/0286226 | A1* | 9/2016 | Ridge | H04N 19/34 |
| 2016/0330457 | A1* | 11/2016 | Ye | H04N 9/67 |
| 2017/0085894 | A1* | 3/2017 | Ramasubramonian | H04N 19/46 |
| 2018/0048913 | A1* | 2/2018 | Sole Rojals | H04N 19/30 |
| 2019/0014298 | A1* | 1/2019 | Ramasubramonian | H04N 19/182 |
| 2019/0014330 | A1* | 1/2019 | Ramasubramonian | H04N 19/187 |
| 2019/0068969 | A1* | 2/2019 | Rusanovskyy | H04N 19/85 |
| 2019/0215517 | A1* | 7/2019 | Ramasubramonian | G06T 5/009 |
| 2019/0297337 | A1* | 9/2019 | Ramasubramonian | H04N 19/98 |

OTHER PUBLICATIONS

ITU-T H.265, Series H: Audiovisual and Multimedia Systems, Infrastructure of audiovisual services—Coding of moving video, High efficiency video coding, The International Telecommunication Union, Oct. 2014, 540 pp.

* cited by examiner

PRECISION OF COMPUTATION AND SIGNALING OF DYNAMIC RANGE ADJUSTMENT AND COLOR REMAPPING INFORMATION

This application claims the benefit of U.S. Provisional Application No. 62/529,968, filed Jul. 7, 2017, the entire content of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques and/or mechanisms for improving the application of the piece-wise polynomial (e.g. first order) function of the colour remapping information (CRI) SEI message specified in H.265/HEVC video coding standard or similar technology, like Dynamic Range Adjustment (DRA). In particular, this disclosure describes techniques for enhancing the precision of the computation and signaling of DRA and/or CRI parameters.

In one example, a method of processing video data includes obtaining, by a video decoding unit, an input picture including a color component having a first color characteristic, obtaining, by the video decoding unit, a plurality of parameters associated with the color component of at least one sample of the input picture where the plurality of parameters are indicative of pivot points associated with a piece-wise linear function associated with the color component, determining, by the video decoding unit, that a value of at least one parameter of the plurality of parameters includes a negative value, applying, by the video decoding unit and on the at least one sample of the input picture, the piece-wise linear function defined with the at least one parameter having a negative value, and generating, by the video decoding unit, at least one output sample of an output picture including the color component having a second color characteristic based on the application of the piece-wise linear function, and outputting, by the video decoding unit, the at least one output sample of the output picture.

In another example, an apparatus configured to process video data includes a memory configured to store pictures of the video data and at least one processor in communication with the memory where the at least one processor is configured to obtain an input picture of the video data including a color component having a first color characteristic, obtain a plurality of parameters associated with the color component of at least one sample of the input picture where the plurality of parameters are indicative of pivot points associated with a piece-wise linear function associated with the color component, determine that a value of at least one parameter of the plurality of parameters includes a negative value, apply, on the at least one sample of the input picture, the piece-wise linear function defined with the at least one parameter having a negative value, generate at least one output sample of an output picture including the color component having a second color characteristic based on the application of the piece-wise linear function, and output the at least one output sample of the output picture.

In yet another example, an apparatus configured to process video data includes means for storing means for storing pictures of the video data, means for obtaining an input picture of the video data including a color component having a first color characteristic, means for obtaining a plurality of parameters associated with the color component of at least one sample of the input picture where the plurality of parameters are indicative of pivot points associated with a piece-wise linear function associated with the color component, means for determining that a value of at least one parameter of the plurality of parameters includes a negative value, means for applying, on the at least one sample of the input picture, the piece-wise linear function defined with the at least one parameter having a negative value, means for generating at least one output sample of an output picture including the color component having a second color characteristic based on the application of the piece-wise linear function, and means for outputting the at least one output sample of the output picture.

In yet another example, a computer-readable storage medium stores instructions that, when executed, causes one or more processors configured to process video data to obtain an input picture of the video data including a color component having a first color characteristic, obtain a plurality of parameters associated with the color component of at least one sample of the input picture where the plurality of parameters are indicative of pivot points associated with a piece-wise linear function associated with the color component, determine that a value of at least one parameter of the plurality of parameters includes a negative value, apply, on the at least one sample of the input picture, the piece-wise linear function defined with the at least one parameter having a negative value, generate at least one output sample of an output picture including the color component having a second color characteristic based on the application of the piece-wise linear function, and output the at least one output sample of the output picture.

The details of one or more examples are set forth in the accompanying drawings and the description below. Other features, objects, and advantages will be apparent from the description and drawings, and from the claims.

DETAILED DESCRIPTION

This disclosure is related to the field of coding of video signals with High Dynamic Range (HDR) and Wide Color Gamut (WCG) representations. More specifically, the techniques of this disclosure include several methods to improve the application of the piece-wise polynomial (e.g. first order) function of the colour remapping information (CRI) SEI message specified in H.265/HEVC video coding standard or similar technology, like Dynamic Range Adjustment (DRA). The disclosure includes techniques and/or mechanisms to enhance the precision of the computation and signaling of DRA and/or CRI parameters.

Video coding standards, including hybrid-based video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. The design of a new video coding standard, namely HEVC, has been finalized by the Joint Collaboration Team on Video Coding (JCT-VC) of ITU-T Video Coding Experts Group (VCEG) and ISO/IEC Motion Picture Experts Group (MPEG). A HEVC draft specification referred to as HEVC Working Draft 10 (WD10), Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, JCTVC-L1003v34, is available from http://phenix.int-evry.fr/jct/doc_end_user/documents/12_Geneva/wg11/JCTVC-L1003-v34.zip. The finalized HEVC standard is referred to as HEVC version 1.

A defect report, Wang et al., "High efficiency video coding (HEVC) Defect Report," Joint Collaborative Team on Video Coding (JCT-VC) of ITU-T SG16 WP3 and ISO/IEC JTC1/SC29/WG11, 14th Meeting: Vienna, AT, 25 Jul.-2 Aug. 2013, JCTVC-N1003v1, is available from http://phenix.int-evry.fr/jct/doc_end_user/documents/14_Vienna/wg11/JCTVC-N1003-v1.zip. The finalized HEVC standard document is published as ITU-T H.265, Series H: Audiovisual and Multimedia Systems, Infrastructure of audiovisual services—Coding of moving video, High efficiency video coding, Telecommunication Standardization Sector of International Telecommunication Union (ITU), April 2013, and another version was published in October 2014.

Figure 1:
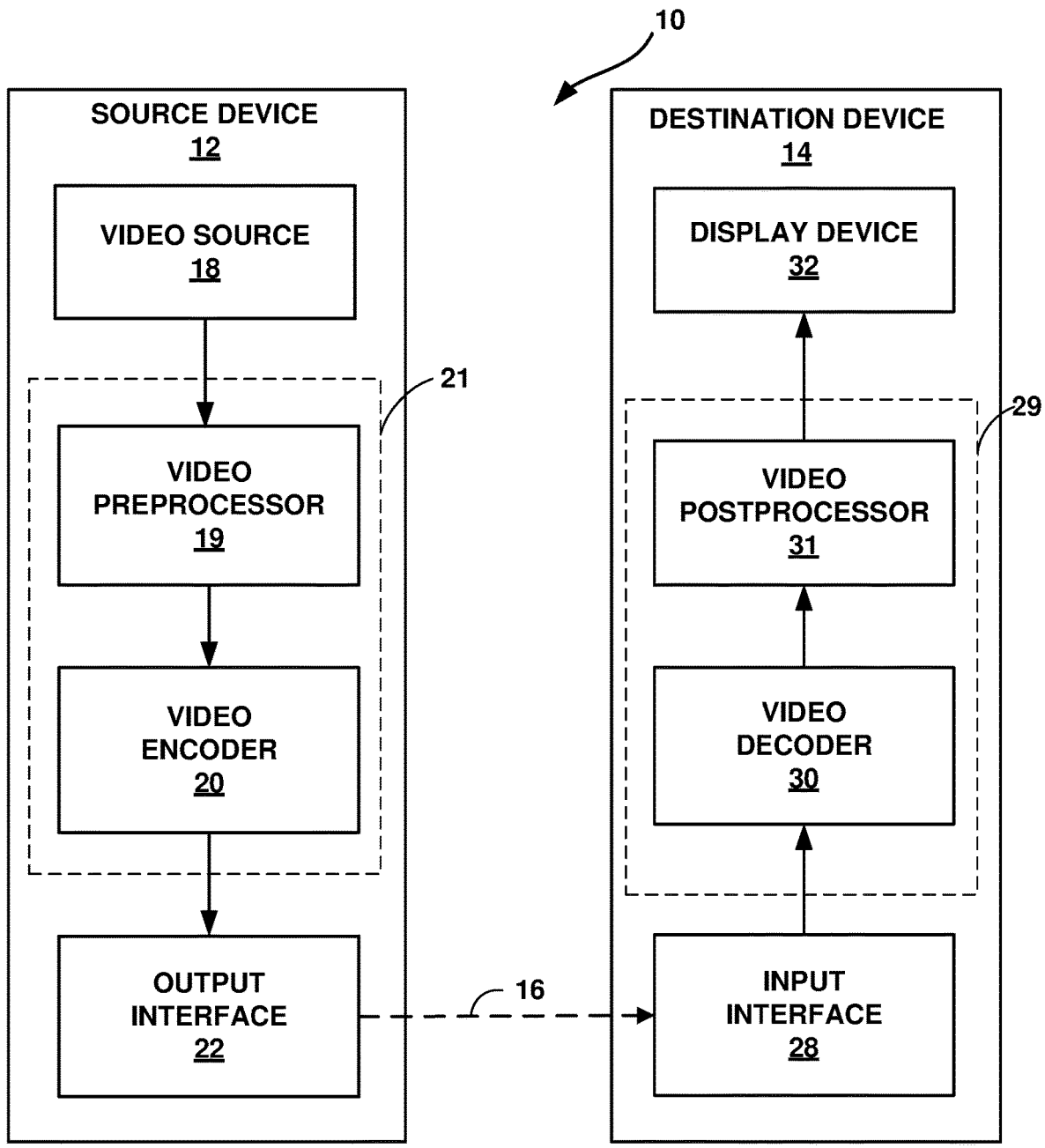
FIG. 1 is a block diagram illustrating an example video encoding and decoding system configured to implement the techniques of the disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by an input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoding unit 21, which includes video preprocessor 19 and video encoder 20, and output interface 22. Destination device 14 includes input interface 28, video decoding unit 29, which includes video decoder 30 and video postprocessor 31, and display device 32. In accordance with this disclosure, video preprocessor 19 and video postprocessor 31 may be configured to apply the example techniques described in this disclosure. For example, video preprocessor 19 and video postprocessor 31 may include a static transfer function unit configured to apply a static transfer function, but with pre- and post-processing units that can adapt signal characteristics.

In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." For ease of description, the disclosure is described with respect to video preprocessor 19 and video postprocessor 31 preforming the example techniques described in this disclosure in respective ones of source device 12 and destination device 14. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoding unit 21. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20 of video encoding unit 21, which is also used by video decoder 30 of video decoding unit 29, that includes syntax elements that describe characteristics and/or processing of blocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

As illustrated, video preprocessor 19 receives the video data from video source 18. Video preprocessor 19 may be configured to process the video data to convert it into a form that is suitable for encoding with video encoder 20. For example, video preprocessor 19 may perform the techniques disclosed herein that improve the performance of using dynamic range adjustment (DRA) and/or color remapping information (CRI) parameter(s) signaling (within and/or external to a bitstream including the video data) and applications, and/or other similar technologies that are applied as pre-processing of data with respect to a given compression scheme implemented by a video codec. Video encoder 20 may perform video encoding on the video data outputted by video preprocessor 19. Video decoder 30 may perform the inverse of video encoder 20 to decode video data, and video postprocessor 31 may perform the inverse of video preprocessor 19 to convert the video data into a form suitable for display. For instance, video postprocessor 31 may perform the techniques disclosed herein that improve the performance of using DRA and/or CRI information signaling, parsing, and applications, and/or other similar technologies that are applied as post-processing of data with respect to a given compression scheme implemented by a video codec.

Video encoding unit 21 and video decoding unit 29 each may be implemented as any of a variety of fixed function and programmable circuitry such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoding unit 21 and video decoding unit 29 may be included in one or more encoders or decoders, either of which may be integrated as part of a combined encoder/decoder (CODEC) in a respective device.

Although video preprocessor 19 and video encoder 20 are illustrated as being separate units within video encoding unit 21 and video postprocessor 31 and video decoder 30 are illustrated as being separate units within video decoding unit 29, the techniques described in this disclosure are not so limited. Video preprocessor 19 and video encoder 20 may be formed as a common device (e.g., same integrated circuit or housed within the same chip or chip package). Similarly, video postprocessor 31 and video decoder 30 may be formed as a common device (e.g., same integrated circuit or housed within the same chip or chip package).

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based three-dimensional video (3DV) extension. In some instances, any bitstream conforming to MVC-based 3DV always contains a sub-bitstream that is compliant to a MVC profile, e.g., stereo high profile. Furthermore, there is an ongoing effort to generate a 3DV coding extension to H.264/AVC, namely AVC-based 3DV. Other examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual. In other examples, video encoder 20 and video decoder 30 may be configured to operate according to the ITU-T H.265, HEVC standard.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. For instance, a NAL unit may encapsulate a RBSP for a CRI SEI message. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

Next generation video applications are anticipated to operate with video data representing captured scenery with High Dynamic Range (HDR) and Wide Color Gamut (WCG). For example, colour (or "color") remapping information (CRI) provides information to enable remapping of reconstructed colour samples of output pictures. The colour remapping information may be applied directly to decoded sample values, regardless of whether these decoded sample values are in the luma and chroma domain or the RGB domain. CRI is currently provided via a supplemental enhancement information (SEI) message utilized for the AVC standard and the HEVC standard. Currently, SEI messages are not-mandatory (e.g., SEI messages may carry information that may not be essential in order to decoder a bitstream received by a decoding device). However, it has been observed through studies that a proper application of CRI and/or DRA before the encoder (e.g., prior to encoding process) and the corresponding inverse CRI and/or DRA after the decoder (e.g., subsequent to the decoding process) does improve the coding efficiency of HDR/WCG content. More generally, the proper application of CRI/DRA improves the coding efficiency of content that is not in the typical SDR/BT.709 container. Consequently, it is expected that technology like CRI and/or DRA to be a normative part of next generation video codecs, that is, part of the compression process itself (e.g., as part of the codec). Therefore, it is important to properly define and improve this technology for compression.

Dynamic range is typically defined as the ratio between the maximum and minimum brightness of the video signal. Dynamic range may also be measured in terms of 'f-stop,' where one f-stop corresponds to a doubling of the signal dynamic range. In MPEG's definition, HDR content is such content that features brightness variation with more than 16 f-stops. In some terms, levels between 10 and 16 f-stops are considered as intermediate dynamic range, but may be considered HDR in other definitions. In some examples, HDR video content may be any video content that has a higher dynamic range than traditionally used video content with a standard dynamic range (e.g., video content as specified by ITU-R Rec. BT. 709). At the same time, the human visual system (HVS) is capable for perceiving much larger dynamic range. However, the HVS includes an adaptation mechanism to narrow a so-called simultaneous range.

Current video applications and services are regulated by Rec.709 and provide SDR, typically supporting a range of brightness (or luminance) of around 0.1 to 100 candelas (cd) per meter squared (m2) (often referred to as "nits"), leading to less than 10 f-stops. The next generation video services are expected to provide dynamic range of up-to 16 f-stops. Although detailed specification is currently under development, some initial parameters have been specified in SMPTE ST.2084 and Rec. 2020.

Supplemental Enhancement information (SEI) messages are included in video bitstreams, typically to carry information that may not be essential to decode the bitstream by the decoder. This information may be useful in improving the display or processing of the decoded output; e.g. such information could be used by decoder-side entities to improve the viewability of the content.

As noted above, CRI is currently provided via SEI messaging. The CRI SEI message defined in the HEVC standard is used to convey information that is used to map pictures in one colour space to another colour space for purposes such as converting output pictures to a representation that is better suited for the characteristics of a given display. The information (e.g., parameters or syntax) of the CRI SEI message may define a color remapping model. For example, the syntax of the CRI SEI message (e.g., the color remapping model) includes three parts: a first set of three, 1-D look-up tables (Pre-LUT), followed by a 3×3 matrix, followed by second set of three, 1-D look-up tables (Post-LUT). For each color component, e.g. R, G, B or Y, Cb, Cr, a respective, independent LUT is defined for both the Pre-LUT and the Post-LUT.

Figure 2:
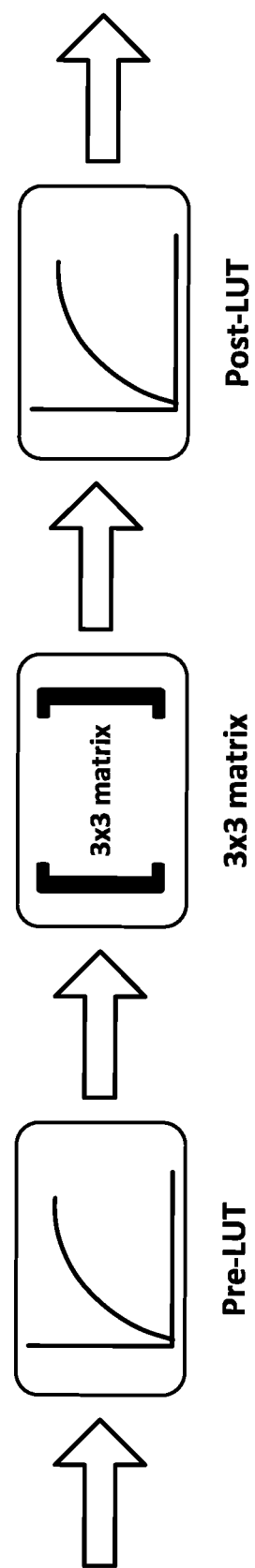
FIG. 2 is a conceptual diagram showing a typical structure of a colour remapping information/process used by video decoder when applying a CRI SEI message.

FIG. 2 shows a typical structure of the colour remapping information/process used by the CRI SEI message. The set of the 3 pre-LUTs may be used for dynamic range adjustment. In some implementations, this information (e.g., CRI and/or DRA) may be signaled (e.g., conveyed, indicated, or transmitted) within an SEI message (e.g., a CRI SEI message) and/or within a bitstream including the coded video data (e.g., the video content intended for rendering). Details of a pre-LUT, a color remap matrix, and a post-LUT are described below with respect to FIG. 3. A color remapping model can be implemented by a video decoding unit (e.g., video decoding unit 29), by a video player that receives output from the video decoding unit or that receives video content from another source, by a display device, or by any other suitable client-side device. In some cases, a color remapping model includes metadata that can be applied by a client-side device. In one illustrative example, once an encoded picture is received and decoded at a client-side device, the client-side device or another device can apply the metadata of a color remapping model when rendering the decoded content.

Input to a color remapping model includes video content. Video content can include decoded video pictures, coded (compressed) video pictures, or video content that has not been compressed. The video content may have one or more color characteristics including at least a first color characteristic. The output of a color remapping model 232 includes remapped video content, which includes the video pictures of the video content remapped from the first color characteristic to a second color characteristic.

Color characteristics of pictures can include color spaces, dynamic ranges, transfer functions, or any other color characteristic that can vary across different video content. One example of color characteristics of pictures can include color spaces. Examples of color spaces include a YCbCr color space with a Luma (Y) component, a blue difference (Cb) chroma component, and a red difference (Cr) chroma component, a red-green-blue (RGB) color space with a red (R) component, a green (G) component, and a blue (B) component, a YUV color space with luma (Y) and color (U, V) components, or other suitable color space. A color remapping model of, for example, a CRI SEI message can be used to perform color space conversion by converting from a first color space to a second color space (e.g., from a YCbCr color space to an RGB color space). Another example of color characteristics of pictures can include dynamic ranges, which may include standard dynamic range (SDR), high dynamic range (HDR), or other suitable dynamic range. A color remapping model may be used to perform tone mapping from a first dynamic range to a second dynamic range. In one illustrative example, source content mastered with HDR/WCG can be transformed for presentation on a display having a smaller color volume such as a SDR display. Another example of color characteristics of pictures can include transfer functions, which allow, for example, for the display of certain video content (e.g., HDR video, SDR video, or other types of video) with certain characteristics. Examples of transfer functions include a Gamma transfer function, a perceptual quantizer (PQ) transfer function, or other suitable transfer function. In one illustrative example, a PQ transfer function can allow for the display of HDR video with a luminance level of up to 10,000 cd/m2 and can be used with the BT.2020 color space. A color remapping model may be used to map from one or more first transfer functions to one or more second transfer functions. One of ordinary skill will appreciate that a color remapping model can be used to map other color characteristics other than those mentioned herein.

Figure 3:
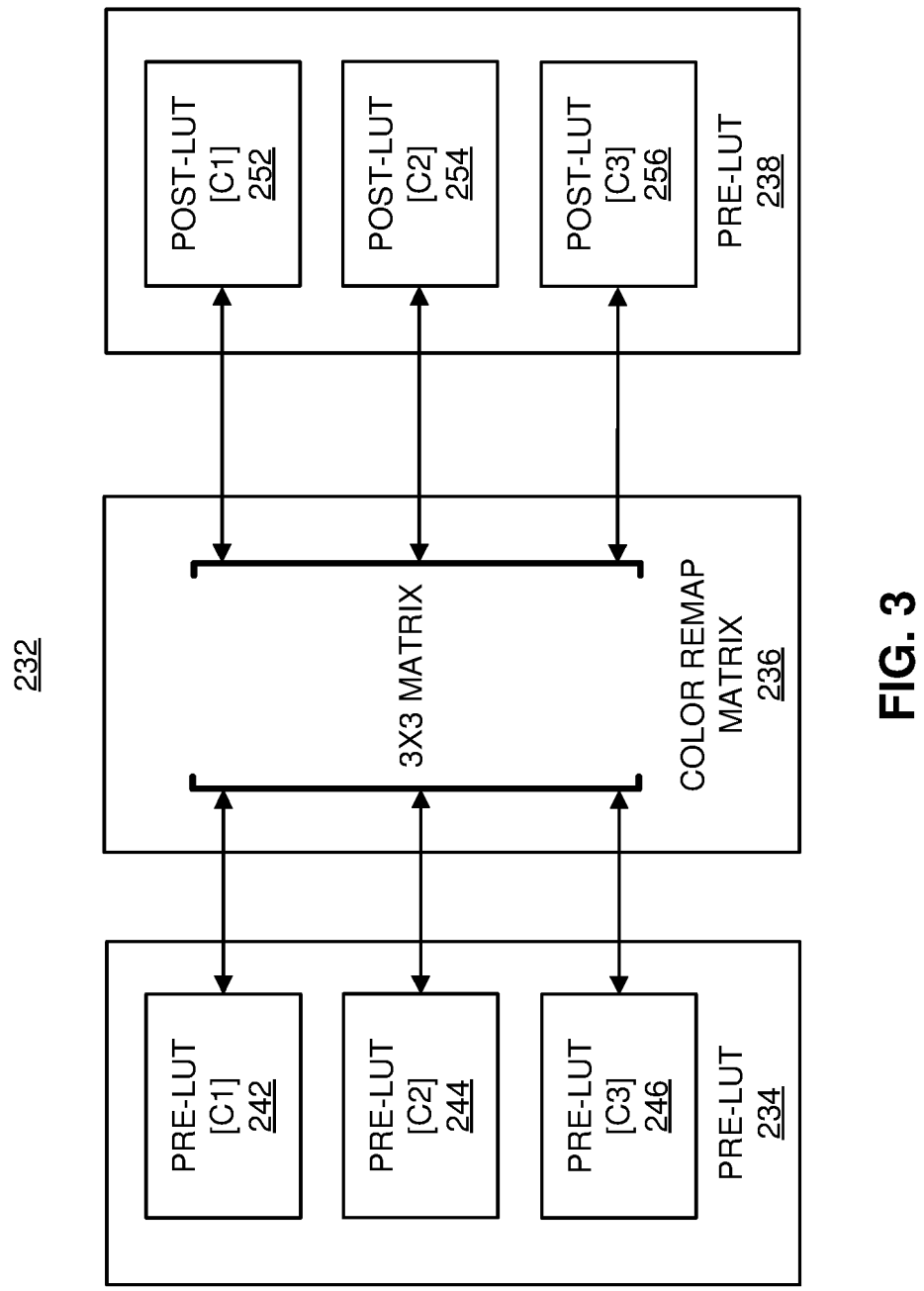
FIG. 3 is a block diagram illustrating details of components of a color remapping model, in accordance with some examples.

FIG. 3 illustrates example details of a pre-LUT 234, a color remap matrix 236, a post-LUT 238, of a color remapping model 232. The pre-LUT 234 may include an independent pre-LUT defined for each color component of the pictures of video content 230, such as for each of the R, G, and B components of the RGB color space, for each of the Y, Cb, and Cr components of the YCbCr color space, for each of the Y, U, and V components of the YUV color space, or for color components of any other suitable color space. Pre-LUT [C1] 242 may be defined for a first color component C1, pre-LUT [C2] 244 may be defined for a second color component C2, and pre-LUT [C3] 246 may be defined for a third color component C3.

Each of the pre-LUTs may be a one-dimensional (1D) LUT and may include a first piece-wise linear function (or transformation) for each color component of one or more samples of a picture (e.g., each pixel of a picture). For example, a piece-wise linear function of pre-LUT[C1] 242 may transform the color component C1 of an input picture having a first color characteristic. In one illustrative example, the pre-LUT[C1] 242 may compress or decompress a Y color component of a sample having Y, Cb, and Cr color components. In certain video content, one or more color components may occupy value ranges that are small due to the container that is used (e.g., mapping content that is restricted to BT.709 colour gamut in a BT.2020 container may result in components occupying a smaller range than the allowed value range); mapping this video range at the encoder using a piece-wise linear function to increase the value range of components may help in improving the coding efficiency. When such mapping is performed, the pre-LUT, and the piece-wise linear mapping function defined therein, may be used to map these components back to original value ranges at the client-side device.

In some examples, the color remap matrix 236 may include a linear model, such as a 3×3 matrix when three color components are present. In one illustrative example, the color remap matrix 236 includes a 3×3 matrix with color remapping coefficients. The color remap matrix 236 is applied across all color components of each picture sample and is used to map the coefficients of the color components. For example, the color remap matrix 236 may be used to convert from one color space (e.g. YCbCr) to another color space (e.g. RGB), from one color volume (e.g., HDR) to another color volume (e.g., SDR), or the like. In one illustrative example, the color remap matrix 236 can be applied to the mapped color components to compensate for the decorrelation between the color components. Decorrelation between color components may increase coding efficiency. For instance, compressing many sequences in the decorrelated YCbCr color space is more efficient than compressing the sequences in an RGB color space. Content that is converted to the YCbCr domain may need to be converted back to the RGB domain and the color remap matrix 236 can be applied to perform this conversion.

Similar to the pre-LUT 234, the post-LUT 238 can include an independent post-LUT defined for being applied to each resulting color component after application of the color remap matrix 236 (each color component of the pictures of the remapped video content 240). For example, post-LUT [C1] 252 can be defined for a first color component C1, post-LUT [C2] 254 can be defined for a second color component C2, and post-LUT [C3] 256 can be defined for a third color component C3. Each post-LUT can be a 1D LUT including a second piece-wise linear function (or transformation) for each color component of one or more samples of a picture. For example, a piece-wise linear function of post-LUT[C1] 252 can transform the color component C1 of a remapped output picture having a second color characteristic. In one illustrative example, the post-LUT[C1] 252 can compress or decompress a R color component of a sample having R, G, and B color components, where the sample is part of a picture that is mapped from a YCbCr color space to the RGB color space. In another example, decompression of one or more of R, G, B color components may be performed to compensate a compression that may be performed at an encoder to improve the coding efficiency; in some video content, sample values occupying certain value range of one or more of R, G, B color components may correspond to a content that may not affect the visual quality of the sequences and these value ranges may be compressed to improve the coding efficiency. In another example, the post-LUT may also be used to apply the transfer function associated with the video content; the transfer function is typically applied to each R, G, B component independently. Color remapping of the output pictures for the display process (which is outside the scope of the HEVC Specification) is optional and does not affect the decoding process specified in the HEVC Specification. However, application standards may define the color remapping process to be mandatory to be conforming to that particular standard.

A piece-wise linear function is defined by intervals $[X_i; X_{i+1}]$ and is linear in each interval. The parameters of the piece-wise linear functions of the pre-LUT 234 and the post-LUT 238, as well as the parameters of the color remap matrix 236, are determined based on the purpose of the particular CRI SEI message (e.g., for converting from HDR to SDR content, for converting from one color space to another color space, for mapping from one transfer function to another transfer function, or any other suitable purpose). The parameters are defined in the syntax and semantics of the CRI SEI message. These parameters can be determined as defined by the particular Application Standard or video coding Standard for which the purpose of the CRI SEI message applies, as known by one of ordinary skill.

An example syntax table of a CRI SEI message is reproduced in Table 1 below. As noted above, although the table illustrates exemplary syntax (e.g., parameters, values, information) as contained within a "CRI SEI message", portions of the syntax (e.g., the information associated with the 3 pre-LUTs) is also known as (or considered) dynamic range adjustment (DRA) information.

For example, as shown below, the syntax elements pre_lut_num_val_minus1[c], pre_lut_coded_value[c][i] and pre_lut_target_value[c][i] can be used to represent the pre-LUTs. The "c" term indicates the index to the color components of a picture. For example, there are more three color components in the RGB color space and in the YCbCr color space. In one illustrative example, c equal to 0 refers to the first component (e.g., Y in the YCbCr color space, G in the RGB color space, or the like), c equal to 1 refers to the second component (e.g., Cb, B, or the like), and c equal to 2 refers to the third component (e.g., Cr, R, or the like). A piece-wise linear curve of the pre-LUT for a particular color component can map the color component from value x (of an input picture) to value y (of a target picture, which may be an intermediate picture in the CRI process). The piece-wise linear curve can be constructed with pivot points that are linearly connected. Linear interpolation is used to map values between two pivot points. Each pivot point is defined by the syntax elements pre_lut_coded_value[c][i] and pre_lut_target_value[c][i]. For example, the syntax element pre_lut_num_val_minus1[c] indicates the number of pivot points in the piece-wise linear remapping function for the c-th color component, the syntax element pre_lut_coded_value[c][i] specifies the value of the i-th pivot point for the c-th component of the input picture, and the syntax element pre_lut_target_value [c][i] specifies the value of the i-th pivot point for the c-th component of the target picture.

The syntax elements log 2_matrix_denom and colour_remap_coeffs[c][i] can be used to represent the matrix. The syntax element log 2_matrix_denom specifies the base 2 logarithm of the denominator for all matrix coefficients. The syntax element colour_remap_coeffs[c][i] specifies the value of the color remapping matrix coefficients. The syntax element colour_remap_matrix_present_flag indicates whether the matrix syntax elements are present or not. For example, colour_remap_matrix_present_flag equal to 1 can be used to indicate that the syntax elements log 2_matrix_denom and colour_remap_coeffs[c][i] are present and a 0 value can indicate that the syntax elements are not present.

The syntax elements post_lut_num_val_minus1[c], post_lut_coded_value[c][i] and post_lut_target_value[c][i] can be used to represent the post-LUTs. Similar to the pre-LUTs, the post LUTs include a piece-wise linear curve. Each pivot point of the curve is defined by the syntax elements post_lut_coded_value[c][i] and post_lut_target_value[c][i], and linear interpolation is used to map values between two pivot points. The syntax element post_lut_num_val_minus1[c]

indicates the number of pivot points in the piece-wise linear remapping function for the c-th color component, the syntax element post_lut_coded_value[c] [i] specifies the value of the i-th pivot point for the c-th component of the input picture, and the syntax element post_lut_target_value[c][i] specifies the value of the i-th pivot point for the c-th component of the target picture.

TABLE 1

CRI SEI Message

| | Descriptor |
|---|---|
| colour_remapping_info( payloadSize ) { | |
|   colour_remap_id | ue(v) |
|   colour_remap_cancel_flag | u(1) |
|   if( !colour_remap_cancel_flag ) { | |
|     colour_remap_persistence_flag | u(1) |
|     colour_remap_video_signal_info_present_flag | u(1) |
|     if( colour_remap_video_signal_info_present_flag ) { | |
|       colour_remap_full_range_flag | u(1) |
|       colour_remap_primaries | u(8) |
|       colour_remap_transfer_function | u(8) |
|       colour_remap_matrix_coefficients | u(8) |
|     } | |
|     colour_remap_input_bit_depth | u(8) |
|     colour_remap_output_bit_depth | u(8) |
|     for( c = 0; c < 3; c++ ) { | |
|       pre_lut_num_val_minus1[ c ] | u(8) |
|       if( pre_lut_num_val_minus1[ c ] > 0 ) | |
|         for( i = 0; i <= pre_lut_num_val_minus1[ c ]; i++ ) { | |
|           pre_lut_coded_value[ c ][ i ] | u(v) |
|           pre_lut_target_value[ c ][ i ] | u(v) |
|         } | |
|     } | |
|     colour_remap_matrix_present_flag | u(1) |
|     if( colour_remap_matrix_present_flag ) { | |
|       log2_matrix_denom | u(4) |
|       for( c = 0; c < 3; c++ ) | |
|         for( i = 0; i < 3; i++ ) | |
|           colour_remap_coeffs[ c ][ i ] | se(v) |
|     } | |
|     for( c = 0; c < 3; c++ ) { | |
|       post_lut_num_val_minus1[ c ] | u(8) |
|       if( post_lut_num_val_minus1[ c ] > 0 ) | |
|         for( i = 0; i <= post_lut_num_val_minus1[ c ]; i++ ) { | |
|           post_lut_coded_value[ c ][ i ] | u(v) |
|           post_lut_target_value[ c ][ i ] | u(v) |
|         } | |
|     } | |
|   } | |
| } | |

Some semantics of CRI SEI messages that are helpful for description in this document are described below. Complete semantics are available in section D.3.32 of the HEVC standard (available at H.265: High Efficiency Video Coding (HEVC), http://www.itu.int/rec/T-REC-H.265-201504-lien).

The colour remapping information SEI message provides information to enable remapping of the reconstructed colour samples of the output pictures. The colour remapping information may be applied directly to the decoded sample values, regardless of whether they (e.g., decoded sample values) are in the luma and chroma domain or the RGB domain. The colour remapping model used in the colour remapping information SEI message is composed of a first piece-wise linear function applied to each colour component (specified by the "pre" set of syntax elements herein), a three by-three matrix applied to the three colour components, and a second piece-wise linear function applied to each colour component (specified by the "post" set of syntax elements herein). Note that colour remapping of the output pictures for the display is optional and does not affect the decoding process specified in this Specification.

colour_remap_id contains an identifying number that may be used to identify the purpose of the colour remapping information. The value of colour_remap_id shall be in the range of 0 to $2^{32}-2$, inclusive.

Values of colour_remap_id from 0 to 255 and from 512 to $2^{31}-1$ may be used as determined by the application. Values of colour_remap_id from 256 to 511, inclusive, and from $2^{31}$ to $2^{32}-2$, inclusive are reserved for future use by ITU-T| ISO/IEC. Decoders shall ignore all colour remapping information SEI messages containing a value of colour_remap_id in the range of 256 to 511, inclusive, or in the range of $2^{31}$ to $2^{32}-2$, inclusive, and bitstreams shall not contain such values.

The colour_remap_id can be used to support different colour remapping processes that are suitable for different display scenarios. For example, different values of colour_remap_id may correspond to different remapped colour spaces supported by displays.

colour_remap_matrix_coefficients has the same semantics as specified in clause E.3.1 for the matrix_coeffs syntax element, except that colour_remap_matrix_coefficients specifies the colour space of the remapped reconstructed picture, rather than the colour space used for the CLVS. When not present, the value of colour_remap_matrix_coefficients is inferred to be equal to the value of matrix_coeffs.

colour_remap_input_bit_depth specifies the bit depth of the luma and chroma components or the RGB components of the associated pictures for purposes of interpretation of the colour remapping information SEI message. When any colour remapping information SEI messages is present with the value of colour_remap_input_bit_depth not equal to the bit depth of the coded luma and chroma components or that of the coded RGB components, the SEI message refers to the hypothetical result of a transcoding operation performed to convert the coded video to a converted video with bit depth equal to colour_remap_input_bit_depth.

The value of colour_remap_input_bit_depth shall be in the range of 8 to 16, inclusive. Values of colour_remap_input_bit_depth from 0 to 7, inclusive, and from 17 to 255, inclusive, are reserved for future use by ITU-T | ISO/IEC. Decoders shall ignore all colour remapping SEI messages that contain a colour_remap_input_bit_depth in the range of 0 to 7, inclusive, or in the range of 17 to 255, inclusive, and bitstreams shall not contain such values.

colour_remap_bit_depth specifies the bit depth of the output of the colour remapping function described by the colour remapping information SEI message. The value of colour_remap_bit_depth shall be in the range of 8 to 16, inclusive. Values of colour_remap_bit_depth from 0 to 7, inclusive, and in the range of 17 to 255, inclusive, are reserved for future use by ITU-T I ISO/IEC. Decoders shall ignore all colour remapping SEI messages that contain a value of colour_remap_bit_depth from 0 to 7, inclusive, or in the range of 17 to 255, inclusive.

pre_lut_num_val_minus1[c] plus 1 specifies the number of pivot points in the piece-wise linear remapping function for the c-th component, where c equal to 0 refers to the luma or G component, c equal to 1 refers to the Cb or B component, and c equal to 2 refers to the Cr or R component. When pre_lut_num_val_minus1[c] is equal to 0, the default end points of the input values are 0 and $2^{colour\_remap\_input\_bit\_depth}-1$, and the corresponding default end points of the output values are 0 and $2^{colour\_remap\_bit\_depth}-1$, for the c-th component. In bitstreams conforming to this version of this Specification, the value of pre_lut_num_val_minus1[c] shall be in the range of 0 to 32, inclusive.

pre_lut_coded_value[c][i] specifies the value of the i-th pivot point for the c-th component. The number of bits used to represent pre_lut_coded_value[c][i] is ((colour_remap_input_bit_depth+7)>>3)<<3.

pre_lut_target_value[c][i] specifies the value of the i-th pivot point for the c-th component. The number of bits used to represent pre_lut_target_value[c][i] is ((colour_remap_bit_depth+7)>>3)<<3.

colour_remap_matrix_present_flag equal to 1 indicates that the syntax elements log 2_matrix_denom and colour_remap_coeffs[c][i], for c and i in the range of 0 to 2, inclusive, are present. colour_remap_matrix_present_flag equal to 0 indicates that the syntax elements log 2_matrix_denom and colour_remap_coeffs[c][i], for c and i in the range of 0 to 2, inclusive, are not present.

log 2_matrix_denom specifies the base 2 logarithm of the denominator for all matrix coefficients. The value of log 2_matrix_denom shall be in the range of 0 to 15, inclusive. When not present, the value of log 2_matrix_denom is inferred to be equal to 0.

colour_remap_coeffs[c][i] specifies the value of the three-by-three colour remapping matrix coefficients. The value of colour_remap_coeffs[c][i] shall be in the range of $-2^{15}$ to $2^{15}-1$, inclusive. When colour_remap_coeffs[c][i] is not present, it is inferred to be equal to 1 if c is equal to i, and inferred to be equal to 0 otherwise. When colour_remap_matrix_present_flag is equal to 0, the colour remapping matrix is inferred to be equal to the identity matrix of size 3×3.

The variable matrixOutput[c] for c=0, 1 and 2 is derived as follows:

```
roundingOffset = log2_matrix_denom == 0 ? 0 : 1 <<
( log2_matrix_denom − 1 )
matrixOutput[ c ] = Clip3( 0, ( 1 <<
colour_remap_output_bit_depth ) − 1,
  ( colour_remap_coeffs[ c ][ 0 ] * matrixInput[ 0 ] +
colour_remap_coeffs[ c ][ 1 ] *
    matrixInput[ 1 ] + colour_remap_coeffs[ c ][ 2 ] * matrixInput[ 2 ] +
roundingOffset )
      >> log2_matrix_denom )
                                                              (D-1)
``` where matrixInput[c] is the input sample value of the c-th colour component, and matrixOutput[c] is the output sample value of the c-th colour component.

The semantics of post_lut_num_val_minus[ ], post_lut_coded_value[ ][ ], and post_lut_target_value[ ][ ] are similar to the semantics of pre_lut_num_val_minus[ ], pre_lut_coded_value[ ][ ], and pre_lut_target_value[ ][ ], respectively; the number of bits used to represent post_lut_coded_value[ ][ ], and post_lut_target_value[ ][ ] is equal to colour_remap_bit_depth.

However, there may be one or more disadvantages with the above-described colour remapping information (CRI) SEI messages in their ability to indicate (e.g., signal or convey or include) the the precision of the piece-wise mapping in the pre-LUT(s) and the post-LUT(s) which are often limited in bit depth in which, for example, floating-point numbers may not be utilized.

As one example of a disadvantage, The LUT coded values and target values define (e.g., indicate or identify) the end points of each range of the piece-wise linear function. For a given point, a LUT coded value is indicative of a sample value of a given color component of the input (e.g., input frame) and a LUT target value is indicative of the corresponding sample value of the same color component in the target frame. These coded and target values are integer values, which may limit the precision of mapping. In various embodiments, the LUT coded values correspond (i.e., are associated with) the input values. In various examples, a coded value may be a representation (i.e., based on or a function of) of an input value. For example, a coded value may be based on an input value such that a bit depth of the coded value is based on (e.g., is modified with respect to) the bit depth of the associated input value.

As another example, currently, LUT target values and coded values are restricted to being positive values, thus limiting the slopes of the piece-wise linear functions. One example of such a restriction (i.e., constraint) is that the first range of the piece-wise linear function is necessarily a positive value.

As yet another example, processing of CRI included within a CRI SEI message is performed on the input data bit depth or the output data bit depth. These bit depths are constrained (e.g., restricted in the bit depth values allowed) by system designs and/or existing video formats. In some coding scenarios, having such limited (i.e., limited based on the constrained (or restricted) bit depth of the data on which processing of the CRI is performed) precision in the intermediate steps results in non-optimal performance.

As another example of a disadvantage, CRI pre-LUT and CRI post-LUT are characterized with equal bit depths for output values of the pre-LUT, input values (and therefore the associated coded values) and output values (and therefore the associated target values), despite the fact that CRI pre-LUT and CRI post-LUT are expected to be operate on different colour spaces and may serve a different purpose from one another.

In accordance with one or more techniques of this disclosure, in an effort to improve the performance of using DRA and/or CRI signaling of parameters (within and/or external to a bitstream including video data) and applications, and/or other similar technologies applied as pre-processing and/or post-processing of data with respect to a given compression scheme implemented by a video codec, the disclosure describes methods for increasing the precision of DRA and/or CRI signalled parameters and the processing using such signalled parameters. It should be understood, that one or more of the techniques of this disclosure may be applied independently, or in combination with others although all combinations are not explicitly discussed.

In accordance with one or more techniques of this disclosure, a video coding unit (e.g., video encoding unit 21 and/or video decoding unit 29) may signal modified and/or additional parameters, for example, within a CRI SEI message such that the CRI SEI message conveys enhanced precision with respect to certain parameters and allows for more precise processing of these parameters. It should be appreciated that modified and/or additional parameters in accordance with the present disclosure may also, or alternatively, be signaled in association with DRA information such that the DRA information may likewise be conveyed with enhanced precision with respect to certain parameters and thereby enable more precise processing of these parameters.

For example, in various embodiments of the present disclosure, a video coding unit may decouple (e.g., disassociate) the bit depths of the coded values and the target values from the bit depths of the input values and output values thereby allowing for externally-defined (e.g., user-defined or user specified) precision for intermediate results. In accordance with the present disclosure, the bit depths of coded values, target values, input values, and output values may be expressed with all combinations with respect to bit depths. For example, in one embodiment, the bit depths of each of the coded values, target values, input values, and output values may be different from one another. In yet another embodiment of the present disclosure, the bit depth of the target value and the bit depth of the coded value are signalled in the bitstream and may be higher in in value than the bit depths of the input signal and output signal. Alternatively, or additionally, in various embodiments of the present disclosure, the bit depth of the coded and target values may be decoupled for pre LUT and post LUT.

Alternatively, or additionally, in accordance with one or more techniques of the present disclosure, a video coding unit may indicate bit depth characteristics of the remapping matrix input and output or assume (e.g., be configured for) a derivation process for bit depth characteristics from parameters of the target bit depth of the Pre-LUT and the coded bit depth of the Post-LUT.

Alternatively, or additionally, in accordance with one or more techniques of the present disclosure, a video coding unit may indicate (e.g., signal) or assume (e.g., be configured to utilize or operate with) an increment of bit depth (incremental bit depth) for utilization during the intermediate steps of the CRI computation. In this manner, a video coding unit configured in accordance with the present disclosure may perform the intermediate steps of, for example, CRI and/or DRA, with higher precision, thus achieving better performance.

Alternatively, or additionally, in accordance with one or more techniques of the present disclosure, a video coding unit may enable (e.g., may be configured to enable and/or may be configured to operate using) LUT coded values and LUT target values as negative values. Similarly, a video coding unit, in accordance with the present disclosure, may allow the coded values and target values to go beyond (comprise values higher/greater than) the maximum value allowed by the input bit depth and/or the output bit depth. This technique of the present disclosure, permits (e.g., enables) larger slopes to be signalled for the ranges of the piece-wise linear function. Alternatively, in some embodiments of the present disclosure, the video coding unit may be configured to only allow the first and last coded and target values to extend (e.g., go beyond the maximum value allowed by the corresponding input bit depth and/or the output bit depth) in this way.

By enabling flexibility in the LUT coded parameter values and LUT target parameter values, the present disclosure provides a mechanism to more precisely and accurately represent the intent of the content creator with respect to the color detail rendered within, for example, extremely dark and/or extremely bright regions of output pictures in the remapped color space.

As noted above, CRI is currently provided via SEI messaging. The CRI SEI message defined in the HEVC standard is used to convey information that is used to map pictures in one colour space to another colour space for purposes such as converting output pictures to a representation that is better suited for the characteristics of a given display.

In various implementations of the present disclosure, two values, V1 and V2, in the coded value range and two values, V3 and V4, in the target value range are signalled, by a video coding unit, to indicate the mapping between the input value range and the coded value range and output value range and target value range, respectively. Such signalling is needed when the signalling scale values that require a maximum value to be "outside" (i.e., not within) the allowed value range of input bit depth and/or the output bit depth.

In accordance with one or more techniques of this disclosure, in various embodiments, a video coding unit may signal (or receive) a colour_remap_lut_bit_depth parameter that indicates the bit depth of the coded and target values. For example, the input signal and the output signal may have (i.e., the values of the input signal and the output signal may be signalled using) a bit depth of 10 (i.e., 10 bits), while the coded values and the target values may have a bit depth of 12 bits, as indicated by colour_remap_lut_bit_depth parameter. Utilization of the colour_remap_lut_bit_depth parameter by a video coding unit provides for more precision for the slope and offset of the corresponding linear function in each range. In such embodiments, the additional bits (e.g., an additional bit depth of 2 bits) of colour_remap_lut_bit_depth on the top of (e.g., in addition to) colour_remap_input_bit_depth are used to indicate the non-integer (e.g. fractional) part of the input and output values. For example, the 2 LSBs of coded values can indicate 0, 0.25, 0.5 or 0.75, while the 10 MSBs indicate the integer part (from 0 to 1023).

The following pseudo-code shows an example of an embodiment of the present disclosure with input data (e.g., an input value associated with an input signal) in 10-bit and coded/target values in 12-bit precision:

```
for each range r
  for each sample inputValue in the range
      outputValue = ((targetValue[r + 1] * ((inputValue << 2) −
      codedValue[r]) + targetValue[r] * (coded Value[r + 1] −
      (inputValue << 2))) / (codedValue[r + 1] − codedValue[r])) >> 2;
  end
end
      where << is the left-shift bit-wise operation
```

Additionally, or alternatively, in accordance with one or more techniques of this disclosure, a video coding unit may utilize (e.g., signal and/or receive) a new syntax element colour_remap_increment_bit_depth. In such embodiments, the output of the first LUT is expressed with a bit depth equaling colour_remap_lut_bit_depth+colour_remap_increment_bit_depth. In this way, a video coding unit is configured to keep (i.e., maintain) precision after the first LUT, without clipping back the bit depth after the first LUT to a lower bit depth. The following steps (e.g., 3×3 matrix and post-LUT) of, for example, CRI are applied at the higher bit depth. At the output of the post-LUT, the bit depth of data is put (e.g., modified to or converted) to a bit depth equaling the colour_remap_output_bit_depth value.

The following pseudo-code shows an example of an embodiment of the present disclosure implementing the colour_remap_increment_bit_depth syntax element:

```
max_value = (1 << (colour_remap_lut_bit_depth +
colour_remap_increment_bit_depth)) − 1;
for each range r
  for each sample inputValue in the range
      tempval = (((targetValue[r + 1] * (inputValue − codedValue[r]) +
      targetValue[r] * (codedValue[r + 1] − inputValue)) <<
      colour_remap_increment_bit_depth) / (codedValue[r + 1] −
      codedValue[r]));
      outputValue = iClip(tempval, 0, max_v);
  end
end
``` where << is the left-shift bit-wise operation, and iClip is a clipping function of the first argument to the minimum given by the second argument and the maximum given by the third argument.

Additionally, or alternatively, in accordance with one or more techniques of this disclosure, in various embodiments, a video coding unit may be configured to enable signaling of the first point as part of a LUT (e.g., pre-LUT and/or post-LUT) as a negative value. Furthermore, or alternatively, the video coding unit may be configured to signal other points of a LUT has negative values. The example syntax, shown below, may implement the technique of the present disclosure of enabling a video coding unit to process (e.g., signal or receive) the first point of a LUT as a negative value.

The example syntax below illustrates changes to the syntax of Table 1 (CRI SEI Message Syntax) shown above. Differences are indicated using underlined text (example of a change to the text). Specifically, the syntax elements "pre_lut_coded_value[c][0]" and "pre_lut_target_value[c][0]" have been added and the "for loop" now begins at i=1. The descriptor "se(v)" indicates that the syntax elements pre_lut_coded_value[c][0] and pre_lut_target_value[c][0] respectively may comprise a signed integer 0-th order Exp-Golomb-coded syntax element with the left bit first.

```
for( c = 0; c < 3; c++ ) {
    pre_lut_num_val_minus1[ c ]                              u(8)
    if( pre_lut_num_val_minus1[ c ] > 0 )
        pre_lut_coded_value[ c ][ 0 ]                         se(v)
        pre_lut_target_value[ c ][ 0 ]                        se(v)
        for( i = 1; i <= pre_lut_num_val_minus1[ c ]; i++ ) {
            pre_lut_coded_value[ c ][ i ]                     u(v)
            pre_lut_target_value[ c ][ i ]                    u(v)
        }
}
```

Figure 4:
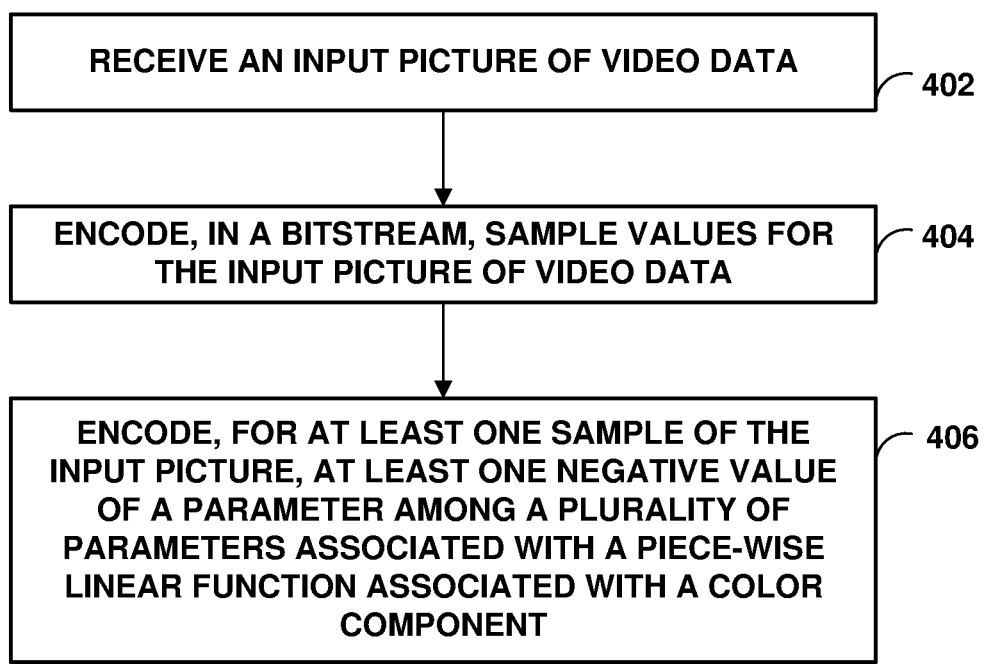
FIG. 4 is a flowchart illustrating an example method for encoding a picture of video data in conjunction with parameters associated with a piece-wise linear function associated with a color component of the picture in accordance with the techniques of this disclosure.

FIG. 4 is a flowchart illustrating an example method for encoding a picture of video data in conjunction with parameters associated with a piece-wise linear function associated with a color component of the picture in accordance with the techniques of this disclosure. For purposes of explanation, the method of FIG. 4 is described below as being performed by video encoding unit 21 and the components thereof (e.g., illustrated in FIG. 1), though the method of FIG. 4 may be performed by other video encoding units.

Video encoding unit 21 may receive a picture of video data (402). For instance, video encoder 20 may receive samples of an input picture including a color component having a first color characteristic from video preprocessor 19. Video encoding unit 21 may encode, in a bitstream, samples values for the input picture of video data (404). For instance, video encoder 20 may encode samples/pixel values of the current picture of video data using any combination of inter and intra encoding modes. In some examples, video encoder 20 may encode the samples using H.265/HEVC.

Video encoding unit 21 may encode, for example, in the bitstream, and for at least one sample of the input picture of the video data, a plurality of parameters associated with the color component of at least one sample of the input picture (406). For example, the video encoding unit 21 encodes, a value of at least one parameter of the plurality of parameters as a negative value. The video encoding unit 21 encodes the plurality of parameters to indicative pivot points associated with a piece-wise linear function associated with the color component such that the negative value of the at least one parameter is utilized to define the piece-wise linear function. The application of the piece-wise linear function results in the generation of at least one output sample of an output picture that includes the color component characterized (or associated with) a second color characteristic distinct from the first color characteristic.

Figure 5:
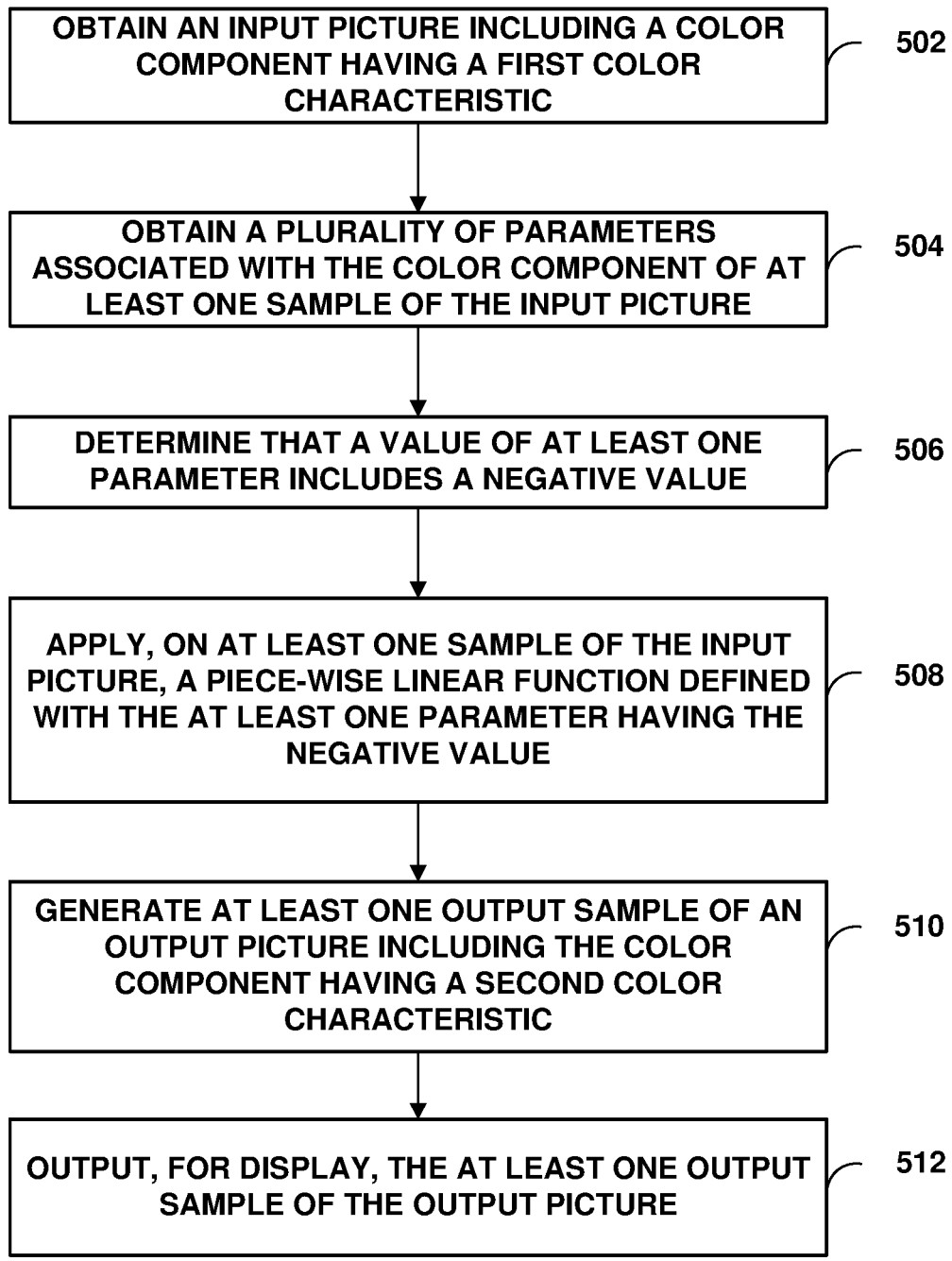
FIG. 5 is a flowchart illustrating an example method for processing a picture of video data in conjunction with parameters associated with a piece-wise linear function associated with a color component of the picture in accordance with the techniques of this disclosure.

FIG. 5 is a flowchart illustrating an example method for processing (e.g., decoding) a picture of video data in conjunction with parameters associated with a piece-wise linear function associated with a color component of the picture in accordance with the techniques of this disclosure. For purposes of explanation, the method of FIG. 5 is described below as being performed by video decoding unit 29 and the components thereof (e.g., illustrated in FIG. 1), though the method of FIG. 9 may be performed by other video decoding units.

Video decoding unit 29 obtains an input picture including a color component having a first color characteristic (502). Video decoding unit further obtains a plurality of parameters associated with the color component of at least one sample of the input picture (504). The plurality of parameters are indicative of pivot points associated with a piece-wise linear function associated with the color component. The video decoding unit determines that a value of at least one parameter of the plurality of parameters includes a negative value (506). The video decoding unit applies, on the at least one sample of the input picture, the piece-wise linear function defined with the at least one parameter having the negative value (508). The video decoding unit generates at least one output sample of an output picture including the color component having a second color characteristic based on the application of the piece-wise linear function (510). The video decoding unit outputs the at least one output sample of the output picture (512).

Figure 6:
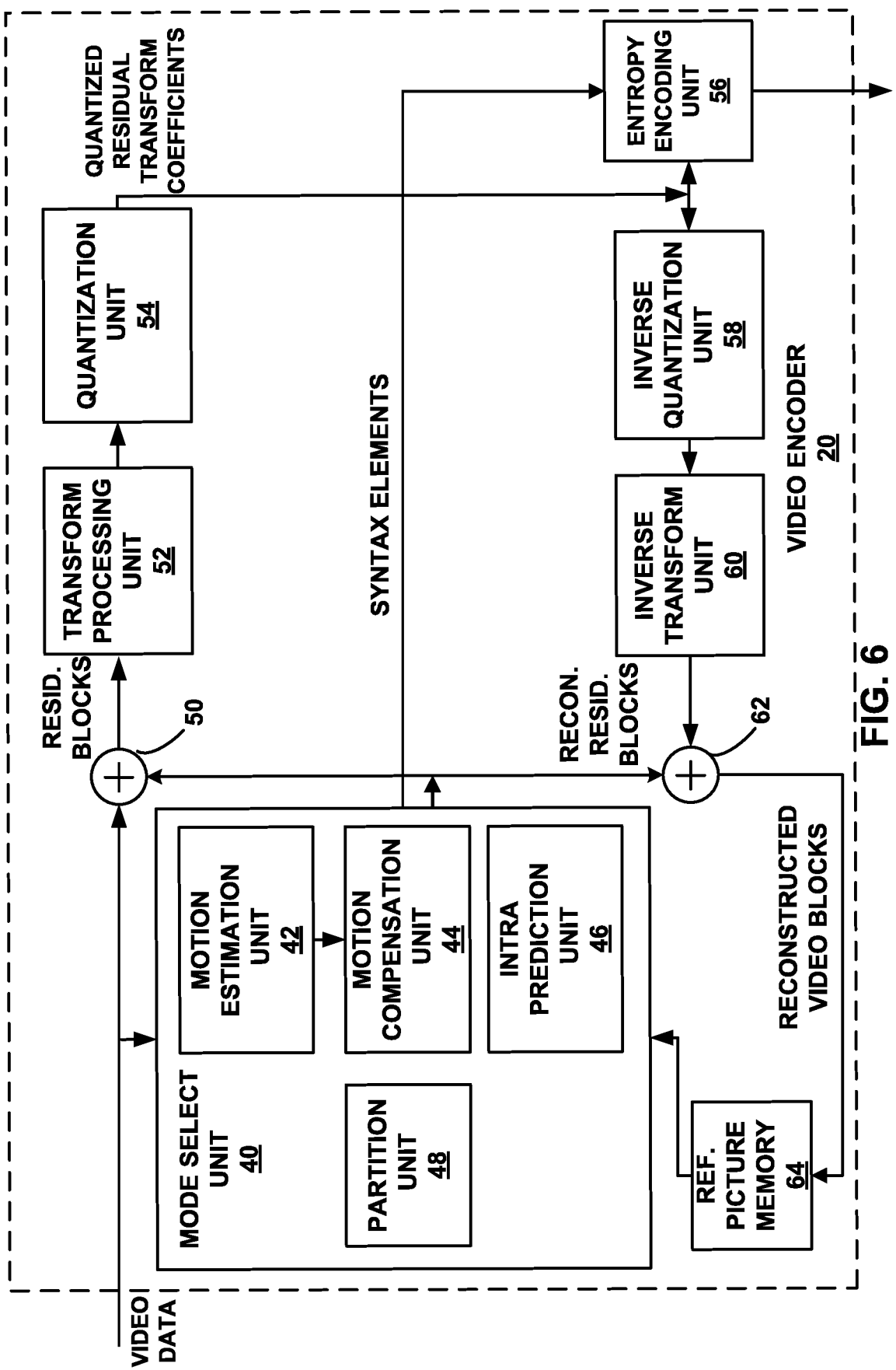
FIG. 6 is a block diagram illustrating an example video encoder that may implement the techniques described in this disclosure.

FIG. 6 is a block diagram illustrating an example of video encoder 20. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 6, video encoder 20 receives a current video block within a video frame to be encoded. In the example of FIG. 6, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 6) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into CTUs, and partition each of the CTUs into sub-CUs based on rate-distortion analysis (e.g., rate-distortion optimization). Mode select unit 40 may further produce a quadtree data structure indicative of partitioning of a CTU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes and/or intra prediction modes described in the present disclosure.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Figure 7:
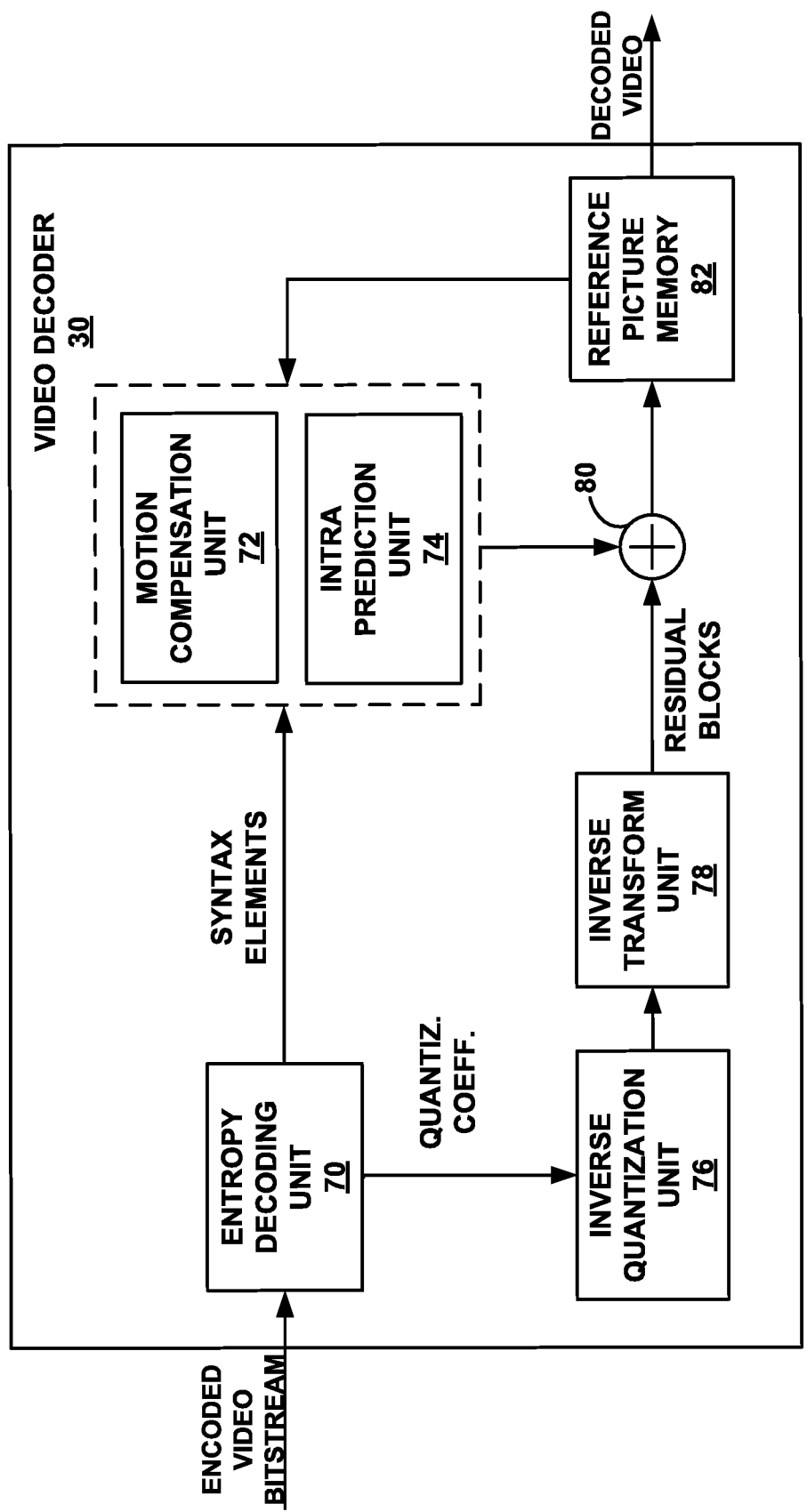
FIG. 7 is a block diagram illustrating an example video decoder that may implement the techniques described in this disclosure.

FIG. 7 is a block diagram illustrating an example of video decoder 30. In the example of FIG. 7, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 6). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signalled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   obtaining, by a video decoding unit, an input picture including a color component having a first color characteristic;
   obtaining, by the video decoding unit, a plurality of parameters associated with the color component of at least one sample of the input picture, the plurality of parameters being indicative of pivot points associated with a piece-wise linear function associated with the color component;
   determining, by the video decoding unit, that a value of at least one parameter of the plurality of parameters includes a negative value;
   applying, by the video decoding unit and on the at least one sample of the input picture, the piece-wise linear function defined with the at least one parameter having a negative value;
   generating, by the video decoding unit, at least one output sample of an output picture including the color component having a second color characteristic based on the application of the piece-wise linear function; and
   outputting, by the video decoding unit, the at least one output sample of the output picture.

2. The method of claim 1 wherein the plurality of parameters comprises information associated with color remapping or dynamic range adjustment.

3. The method of claim 1 further comprising determining the plurality of parameters based on at least one of data within an encoded bitstream that includes the video data or data within supplemental enhancement information, wherein the video data comprises video coding layer (VCL) data.

4. The method of claim 3 further comprising receiving syntax elements within the encoded bitstream that indicate values for the plurality of parameters.

5. The method of claim 1 wherein the at least one parameter having a negative value comprises at least one of a coded value indicative of a pivot point or a target value indicative of the pivot point, coded values being associated with values of the color component having the first color characteristic and target values being associated with values of the color component having the second color characteristic.

6. The method of claim 5 wherein the pivot point indicated by the at least one parameter having a negative value comprises an initial pivot point among a plurality of pivot points defining a piece-wise linear curve associated with the piece-wise linear function.

7. The method of claim 1 wherein a bit depth of the value of the at least one parameter of the plurality parameters exceeds a bit depth associated with at least one of the input picture or the output picture.

8. The method of claim 1 further comprising, in response to the determination that the value of the at least one parameter of the plurality of parameters includes a negative value, constructing a piece-wise linear curve based on the negative value of the at least one parameter.

9. The method of claim 1 further comprising rendering the at least one output sample of the output picture for display.

10. An apparatus configured to process video data, the apparatus comprising:

a memory configured to store pictures of the video data; and at least one processor in communication with the memory, the at least one processor being configured to:

obtain an input picture of the video data including a color component having a first color characteristic;

obtain a plurality of parameters associated with the color component of at least one sample of the input picture, the plurality of parameters being indicative of pivot points associated with a piece-wise linear function associated with the color component;

determine that a value of at least one parameter of the plurality of parameters includes a negative value;

apply, on the at least one sample of the input picture, the piece-wise linear function defined with the at least one parameter having a negative value;

generate at least one output sample of an output picture including the color component having a second color characteristic based on the application of the piece-wise linear function; and output the at least one output sample of the output picture.

11. The apparatus of claim 10 wherein the plurality of parameters comprises information associated with color remapping or dynamic range adjustment.

12. The apparatus of claim 10 wherein the at least one processor is further configured to determine the plurality of parameters based on at least one of data within an encoded bitstream that includes the video data or data within supplemental enhancement information, wherein the video data comprises video coding layer (VCL) data.

13. The apparatus of claim 12 wherein the at least one processor is further configured to receive syntax elements within the encoded bitstream that indicate values for the plurality of parameters.

14. The apparatus of claim 10 wherein the at least one parameter having a negative value comprises at least one of a coded value indicative of a pivot point or a target value indicative of the pivot point, coded values being associated with values of the color component having the first color characteristic and target values being associated with values of the color component having the second color characteristic.

15. The apparatus of claim 14 wherein the pivot point indicated by the at least one parameter having a negative value comprises an initial pivot point among a plurality of pivot points defining a piece-wise linear curve associated with the piece-wise linear function.

16. The apparatus of claim 10 wherein a bit depth of the value of the at least one parameter of the plurality parameters exceeds a bit depth associated with at least one of the input picture or the output picture.

17. The apparatus of claim 10 wherein the at least one processor is further configured to, in response to the determination that the value of the at least one parameter of the plurality of parameters includes a negative value, construct a piece-wise linear curve based on the negative value of the at least one parameter.

18. The apparatus of claim 10 wherein the at least one processor is further configured to render the at least one output sample of the output picture for display.

19. An apparatus configured to process video data, the apparatus comprising:

means for storing pictures of the video data; and means for obtaining an input picture of the video data including a color component having a first color characteristic;

means for obtaining a plurality of parameters associated with the color component of at least one sample of the input picture, the plurality of parameters being indicative of pivot points associated with a piece-wise linear function associated with the color component;

means for determining that a value of at least one parameter of the plurality of parameters includes a negative value;

means for applying, on the at least one sample of the input picture, the piece-wise linear function defined with the at least one parameter having a negative value;

means for generating at least one output sample of an output picture including the color component having a second color characteristic based on the application of the piece-wise linear function; and means for outputting the at least one output sample of the output picture.

20. The apparatus of claim 19 wherein the plurality of parameters comprises information associated with color remapping or dynamic range adjustment.

21. The apparatus of claim 19 further comprising means for determining the plurality of parameters based on at least one of data within an encoded bitstream that includes the video data or data within supplemental enhancement information, wherein the video data comprises video coding layer (VCL) data.

22. The apparatus of claim 21 further comprising means for receiving syntax elements within the encoded bitstream that indicate values for the plurality of parameters.

23. The apparatus of claim 19 wherein the at least one parameter having a negative value comprises at least one of a coded value indicative of a pivot point or a target value indicative of the pivot point, coded values being associated with values of the color component having the first color characteristic and target values being associated with values of the color component having the second color characteristic.

24. The apparatus of claim 23 wherein the pivot point indicated by the at least one parameter having a negative value comprises an initial pivot point among a plurality of pivot points defining a piece-wise linear curve associated with the piece-wise linear function.

25. The apparatus of claim 19 wherein a bit depth of the value of the at least one parameter of the plurality parameters exceeds a bit depth associated with at least one of the input picture or the output picture.

26. The apparatus of claim 19 further comprising means for constructing, in response to the determination that the value of the at least one parameter of the plurality of parameters includes a negative value, a piece-wise linear curve based on the negative value of the at least one parameter.

27. The apparatus of claim 19 further comprising means for rendering the at least one output sample of the output picture for display.

28. A computer-readable storage medium storing instructions that, when executed, causes one or more processors configured to process video data to:

obtain an input picture of the video data including a color component having a first color characteristic;

obtain a plurality of parameters associated with the color component of at least one sample of the input picture, the plurality of parameters being indicative of pivot points associated with a piece-wise linear function associated with the color component;

determine that a value of at least one parameter of the plurality of parameters includes a negative value;

apply, on the at least one sample of the input picture, the piece-wise linear function defined with the at least one parameter having a negative value;

generate at least one output sample of an output picture including the color component having a second color characteristic based on the application of the piece-wise linear function; and output the at least one output sample of the output picture.

29. The computer-readable storage medium of claim 28 further storing instructions that, when executed, cause the one or more processors configured to process the video data to determine the plurality of parameters based on at least one of data within an encoded bitstream that includes the video data or data within supplemental enhancement information, wherein the video data comprises video coding layer (VCL) data.

30. The computer-readable storage medium of claim 28 further storing instructions that, when executed, cause the one or more processors configured to process the video data to construct, in response to the determination that the value of the at least one parameter of the plurality of parameters includes a negative value, a piece-wise linear curve based on the negative value of the at least one parameter.

* * * * *